(12) United States Patent
Layne et al.

(10) Patent No.: US 8,727,109 B2
(45) Date of Patent: May 20, 2014

(54) MODULAR LINK CONVEYOR DRIVE ARRANGEMENTS

(71) Applicant: Span Tech LLC, Glasgow, KY (US)

(72) Inventors: James L. Layne, Bowling Green, KY (US); Lewis W. Ward, Glasgow, KY (US); B. Keith Thomas, Cave City, KY (US); Michael Seiler, Glasgow, KY (US); Stephen C. Fye, Glasgow, KY (US)

(73) Assignee: Span Tech LLC, Glasgow, KY (US)

( * ) Notice: Subject to any disclaimer, the term of this patent is extended or adjusted under 35 U.S.C. 154(b) by 0 days.

(21) Appl. No.: 13/675,563

(22) Filed: Nov. 13, 2012

(65) Prior Publication Data

US 2013/0068595 A1    Mar. 21, 2013

Related U.S. Application Data

(63) Continuation of application No. PCT/US2011/036397, filed on May 13, 2011.

(60) Provisional application No. 61/334,297, filed on May 13, 2010.

(51) Int. Cl.
*B65G 23/06* (2006.01)

(52) U.S. Cl.
USPC .......................................... 198/834; 198/778

(58) Field of Classification Search
USPC ................................................ 198/834, 778
See application file for complete search history.

(56) References Cited

U.S. PATENT DOCUMENTS

| | | | |
|---|---|---|---|
| 1,864,822 A | 6/1932 | Heuze | |
| 2,446,890 A | 8/1948 | Stadelman | |
| 2,787,366 A | 4/1957 | Sykokis | |
| 3,009,562 A | 11/1961 | Sykokis | |
| 3,202,266 A | 8/1965 | Schmermund | |
| 3,270,863 A | 9/1966 | Ackles | |
| 3,597,988 A * | 8/1971 | Hecketsweiler | 198/589 |
| 3,682,295 A | 8/1972 | Roinestad | |
| 3,854,574 A | 12/1974 | Theijsmeijer et al. | |
| 3,910,406 A | 10/1975 | Pulver et al. | |
| 4,142,625 A * | 3/1979 | Bourgeois | 198/570 |
| 4,184,588 A | 1/1980 | Lapeyre | |
| 4,256,220 A | 3/1981 | Lemmer | |
| 4,579,218 A | 4/1986 | Park et al. | |
| 4,850,475 A | 7/1989 | Lupo et al. | |
| 4,887,708 A * | 12/1989 | Brown et al. | 198/831 |
| 4,953,693 A | 9/1990 | Draebel | |
| 5,168,980 A | 12/1992 | Mitsumoto | |
| 5,228,557 A | 7/1993 | Lago | |
| 5,295,917 A | 3/1994 | Hannum | |

(Continued)

*Primary Examiner* — Joseph Dillon, Jr.
(74) *Attorney, Agent, or Firm* — King & Schickli, PLLC

(57) ABSTRACT

An apparatus for conveying one or more objects along a conveying path in a conveying direction includes an endless conveyor chain formed of modular links arranged in rows in a direction transverse to the conveying direction. The links include spaced outer side links forming a part of a conveying surface for the objects to be conveyed and intermediate links interconnected with side links by connector rods, the chain having at least a forward run for conveying one or more objects in the conveying direction. A driver is provided for driving the conveyor chain, and includes a first sprocket adapted for engaging at least one side link along at least one side of the chain, the first sprocket mounted for rotation about an axis generally orthogonal to the conveying direction and the transverse direction. The sprocket may comprise a split sprocket, and may be adapted for pivoting movement.

22 Claims, 28 Drawing Sheets

(56) References Cited

U.S. PATENT DOCUMENTS

| | | |
|---|---|---|
| 5,303,817 A | 4/1994 | Kissee |
| 6,119,848 A * | 9/2000 | Hartness et al. ............. 198/833 |
| 6,209,716 B1 | 4/2001 | Bogle et al. |
| 6,966,432 B2 | 11/2005 | Koban et al. |
| 7,185,753 B2 | 3/2007 | Hartness et al. |
| 7,258,226 B2 | 8/2007 | Nelson et al. |
| 7,762,388 B2 | 7/2010 | Lago |
| 2011/0297513 A1 * | 12/2011 | Lago ............................ 198/850 |

* cited by examiner

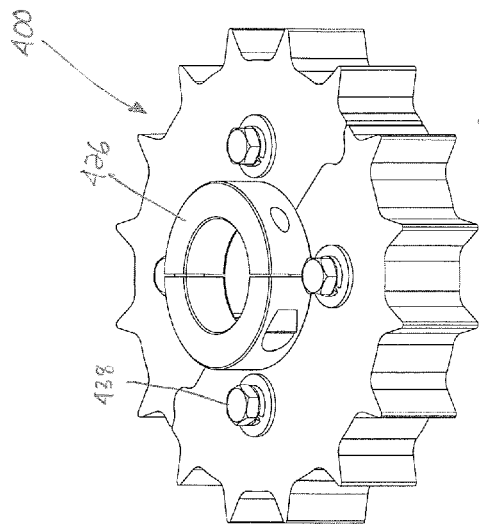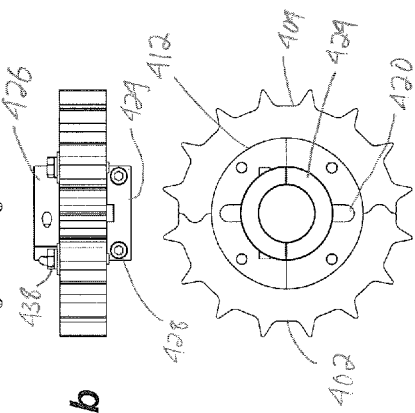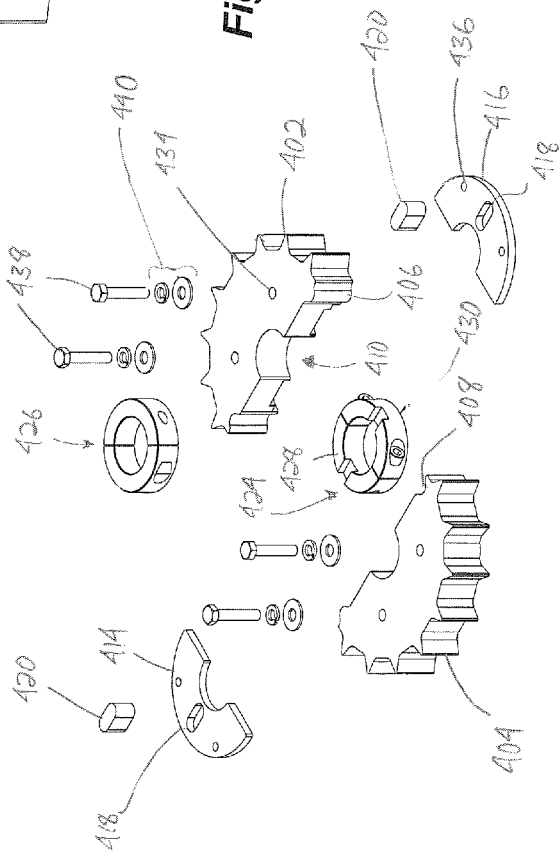
Fig. 9
Fig. 9a
Fig. 9b
Fig. 9c

MODULAR LINK CONVEYOR DRIVE ARRANGEMENTS This application is a continuation of International Patent Application No. PCT/US2011/036397, filed May 13, 2011, which claims the benefit of U.S. Provisional Patent Application No. 61/334,297, filed May 13, 2010, the full disclosures of which are incorporated herein by reference.

FIELD OF THE INVENTION

This disclosure relates generally to driving a conveyor and, more particularly, to drive arrangements for use with modular link conveyors.

BACKGROUND

In the past, modular link conveyors have typically been driven by a plurality of laterally spaced, gang driven sprockets located at the transition of the conveyor from the forward to the return run. Despite the longstanding success of this popular approach, it is not without limits. For one, the amount of power required to drive a particularly long conveyor from one end can be high, and its transfer in the course of operation can generate excessive wear and stress on the sprocket and links of the conveyor chain. The use of such end drives also creates discontinuous conveyors, and thus necessitates the frequent use of devices to transfer articles or objects from the trailing end of one conveyor to the leading end of another. In some cases, there is also no return run in the conventional manner, such as for spiral or helical conveyors common to the food and bookbinding industries, in which case an auxiliary drive (e.g., an internal drum, is used.

Accordingly, there is a need for an improved drive arrangement for modular link conveyors. The drive arrangement should be readily adaptable to many different types of conveyors at minimal cost, and potentially applied in a retrofit situation without extensive effort. The drive arrangement would be adapted to drive a variety of conveyors, including those in which the conveyor chain is arranged to follow a helical or spiral path.

SUMMARY

In one aspect, this disclosure relates to an apparatus for conveying one or more objects along a conveying path in a conveying direction, comprising an endless conveyor chain formed of modular links arranged in rows in a direction transverse to the conveying direction, including spaced outer side links forming a part of a conveying surface for the objects to be conveyed. Intermediate links are interconnected with side links by connector rods, so as to form the chain having at least a forward run for conveying one or more objects in the conveying direction. A driver for driving the conveyor chain includes a first sprocket adapted for engaging at least one side link along at least one side of the chain. The first sprocket is mounted for rotation about an axis generally orthogonal to the conveying direction and the transverse direction.

In one embodiment, the sprocket is arranged for contacting an outer surface of the side link opposite a next-adjacent intermediate link, and may be arranged for contacting an inner or an outer surface of the side link below the conveying surface. A second sprocket may also be mounted for rotation about an axis generally orthogonal to the conveying direction for contacting at least one side link. The conveyor chain may include a return run having the at least one side link contacted by the second sprocket.

Preferably, the first sprocket is supported by a first shaft, the second sprocket is supported by a second shaft, wherein the first and second shafts are connected by a connector. The first and second sprockets may be driven by a common drive motor, and may comprise split sprockets. One of the first or second sprockets may be mounted for pivoting movement relative to the side links of the conveyor.

In another aspect, this disclosure pertains to an apparatus for conveying one or more objects along a conveying path in a conveying direction. The apparatus comprises an endless conveyor chain comprised of a plurality of modular links forming a forward run with a conveying surface for supporting one or more objects in the conveying direction and a return run. A first sprocket is adapted for engaging at least one link along at least one side of the chain along the forward run, and is first sprocket mounted for rotation about an axis generally orthogonal to the conveying direction. A second sprocket adapted for engaging at least one link along at least one side of the chain along the return run is mounted for rotation about an axis generally orthogonal to the conveying direction.

Preferably, the first sprocket engages the link along a first outer side of the chain, and the second sprocket engages the link along a second outer side of the chain opposite the first outer side. The first sprocket may engage the corresponding link under the conveying surface. The first and second sprockets may be spaced in the conveying direction, or in a direction transverse to the conveying direction.

A motor may be provided for driving the first and second sprockets. The motor may include a gear train associated with the motor for driving the first sprocket in an opposite direction relative to the second sprocket. An endless belt may be associated with the motor for driving at least one of the first or second sprockets. A first motor may be provided for driving the first sprocket and a second motor may be provided for driving the second sprocket. One of the first and second sprockets may comprise a split sprocket, and one of the first and second sprockets may be mounted for pivoting movement relative to the links of the conveyor.

A further aspect of the conveyor technology described herein relates to an apparatus comprising a conveyor chain and a sprocket for driving the conveyor chain. The sprocket is mounted for pivoting movement relative to an associated support structure.

In one embodiment, the support structure comprises a shaft, such as a vertical shaft, which may be connected to a motor. The support structure may further comprise a guide for guiding the sprocket. The sprocket may comprise a split sprocket. The apparatus may further include a compression fitting for connecting the sprocket to a support structure.

To provide the pivoting movement, the sprocket may be attached to the support structure by a constant velocity joint. This joint may comprise an inner member having a recess adapted for receiving a ball, and outer member for engaging the ball, and a retainer for retaining the ball relative to the inner and outer members. The constant velocity joint may adapted to allow the sprocket to assume an angle relative to a horizontal plane (such as, for example, ±1-20° relative to a horizontal plane).

A related aspect is an improvement for a spiral conveyor including a conveyor chain adapted for moving along a helical path. The improvement comprises a sprocket adapted for pivoting relative to a shaft for supporting the sprocket. Preferably, the sprocket is connected to the shaft by a constant velocity joint. Most preferably, the shaft comprises a vertical shaft coupled to a drive motor. The constant velocity joint may adapted to allow the sprocket to assume an angle relative to a horizontal plane (such as, for example, ±1-20° relative to a horizontal plane).

In a preferred embodiment, the constant velocity joint comprises an inner member having a recess adapted for receiving a ball, and outer member for engaging the ball, and a retainer for retaining the ball in position relative to the inner and outer members. Most preferably, the sprocket comprises a split sprocket. A compression fitting may be provided for connecting the sprocket to a support structure.

A guide may be provided for guiding the sprocket in a pivoted condition. In one embodiment, the sprocket is positioned along an external edge of the chain. Preferably, the conveyor chain is side flexing, and includes a plurality of gaps along an outer edge for receiving at least one tooth of the sprocket.

Still another aspect of the disclosure pertains to a split sprocket assembly for connecting to a drive shaft for driving a conveyor chain. The sprocket assembly comprises first and second sprocket portions adapted for mating together along the drive shaft, and a retainer for retaining the first and second portions together, the retainer including a first keyway. A first key is provided for associating with the first keyway and engaging at least one of the first and second sprocket portions. At least one driver is provided for engaging the shaft, the driver including a first notch for engaging the first key.

In one embodiment, each sprocket portion includes a recess for receiving the retainer. The recess may further include a cavity for receiving the keyway. The retainer may comprise first and second matching plates. A first of the plates may include the first keyway and a second plate may include a second keyway for receiving a second key for engaging the other of the first and second sprocket portions. Preferably, the driver includes a second notch for receiving the second key, and may comprise a first collar positioned adjacent the retainer. A second collar may be positioned opposite the first collar.

BRIEF DESCRIPTION OF THE DRAWING FIGURES

FIG. 1b is a bottom view of the sprocket of FIG. 1a;

FIG. 2d is a side view of the sprocket of FIG. 2a;

FIG. 5a is an enlarged perspective view of the embodiment of FIG. 5a;

FIG. 9 illustrates a split sprocket assembly;

FIG. 9a is an exploded view of the split sprocket assembly of FIG. 9;

FIG. 9b is side view of the split sprocket assembly of FIG. 9a;

FIG. 9c is a bottom view of the split sprocket assembly of FIG. 9;

DETAILED DESCRIPTION OF THE PREFERRED EMBODIMENTS

Figure 1:
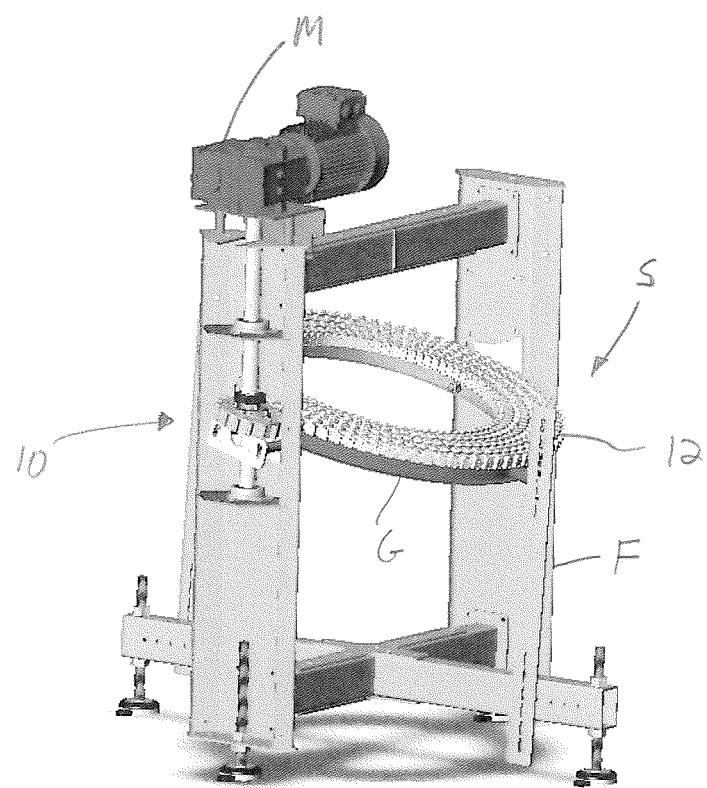
FIG. 1 is a perspective view of a first embodiment of a conveyor.

Reference is now made to FIG. 1, which depicts one embodiment of a drive arrangement 10 for a modular link conveyor chain 12 in a conveyor system S. In this embodiment, the chain 12 is comprised of a plurality of interconnected links 14. Preferably, the links 14 are arranged in rows and include specialized side links 12a, which may be adapted (such as by including a depending arm and an inwardly projecting guide tab) to provide a guiding and hold-down function for the chain 12 along a guide rail G supported by a frame F. Adjacent rows are connected by transverse connectors 13, which are typically stainless steel rods mounted through matching apertures (e.g., slots and holes) in the adjacent rows and retained by locking tabs. A more detailed description of various examples of such a modular link chain arrangement may be found in U.S. Pat. Nos. 4,953,693 and 5,031,757, the disclosures of which are incorporated herein by reference. However, the present drive arrangement is not limited to any particular type of modular link chain or conveyor system.

In this particular application, the chain 12 is shown as being arranged to travel in an endless conveying path with a conveying surface C for supporting objects (not shown) along a forward run U. Although the conveyor 10 shown includes a simple looped path for the chain 12, it should be appreciated that this is merely an example to illustrate the nature of the drive arrangement. In a more typical scenario, the chain 12 would be arranged to follow a helical or spiral path along the forward run.

Figure 1A:
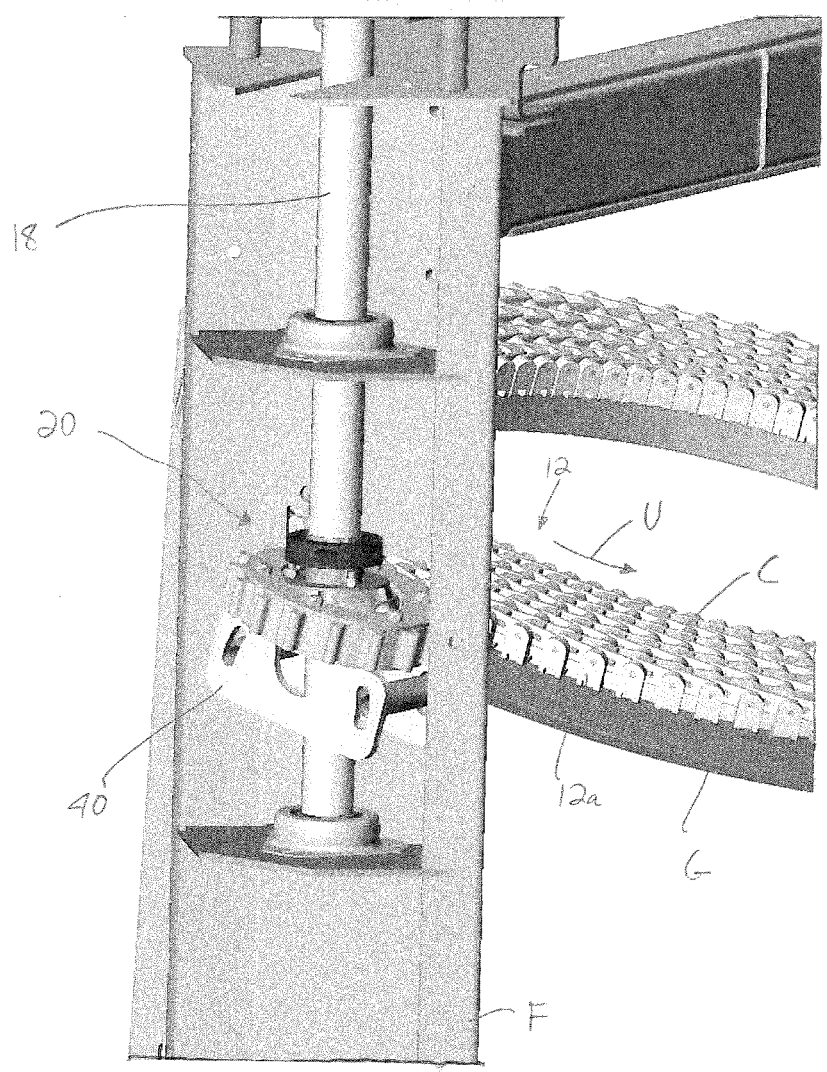
FIG. 1a is an enlarged perspective view of the conveyor of FIG. 1, showing the pivotally mounted sprocket.
Figure 1B:
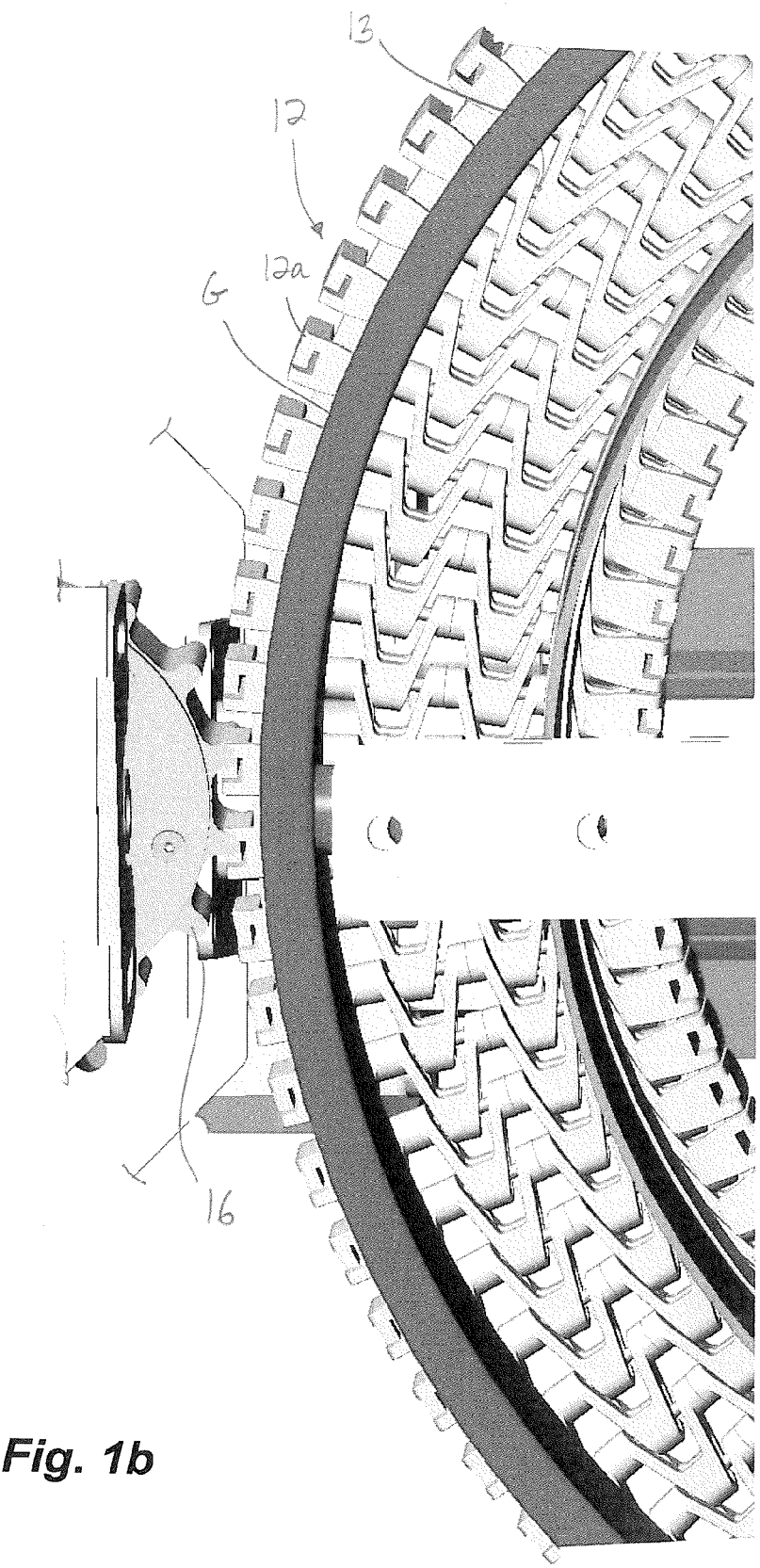
Figure 1C:
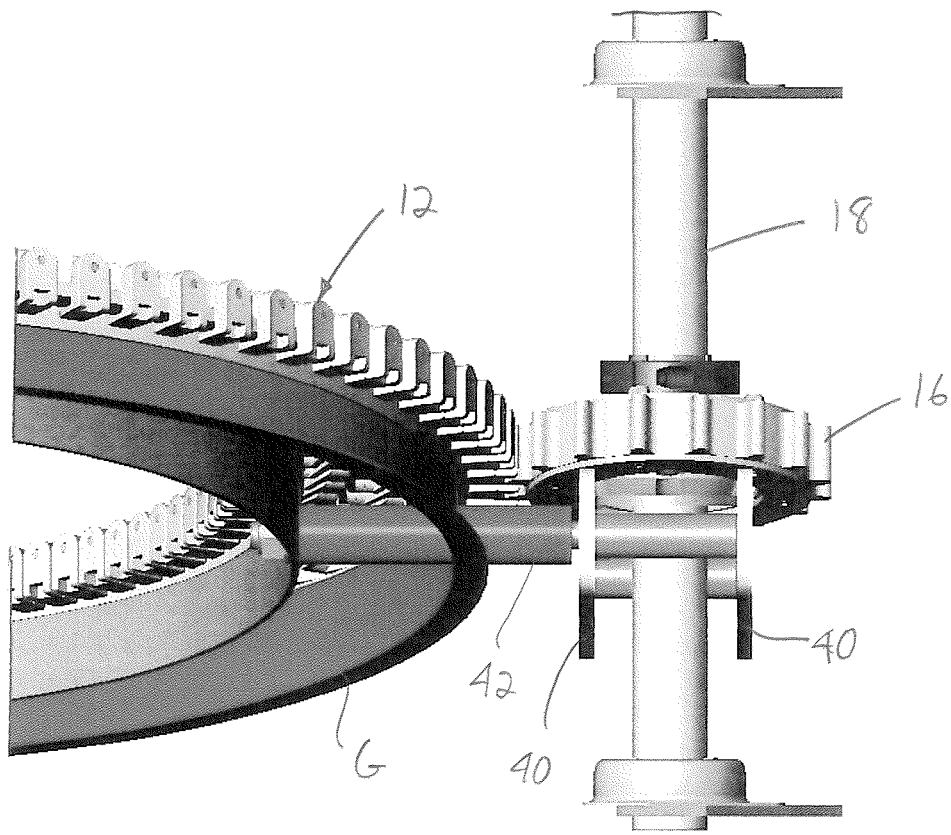
FIG. 1c is a rear, partially cutaway view of the sprocket of FIG. 11.
Figure 1D:
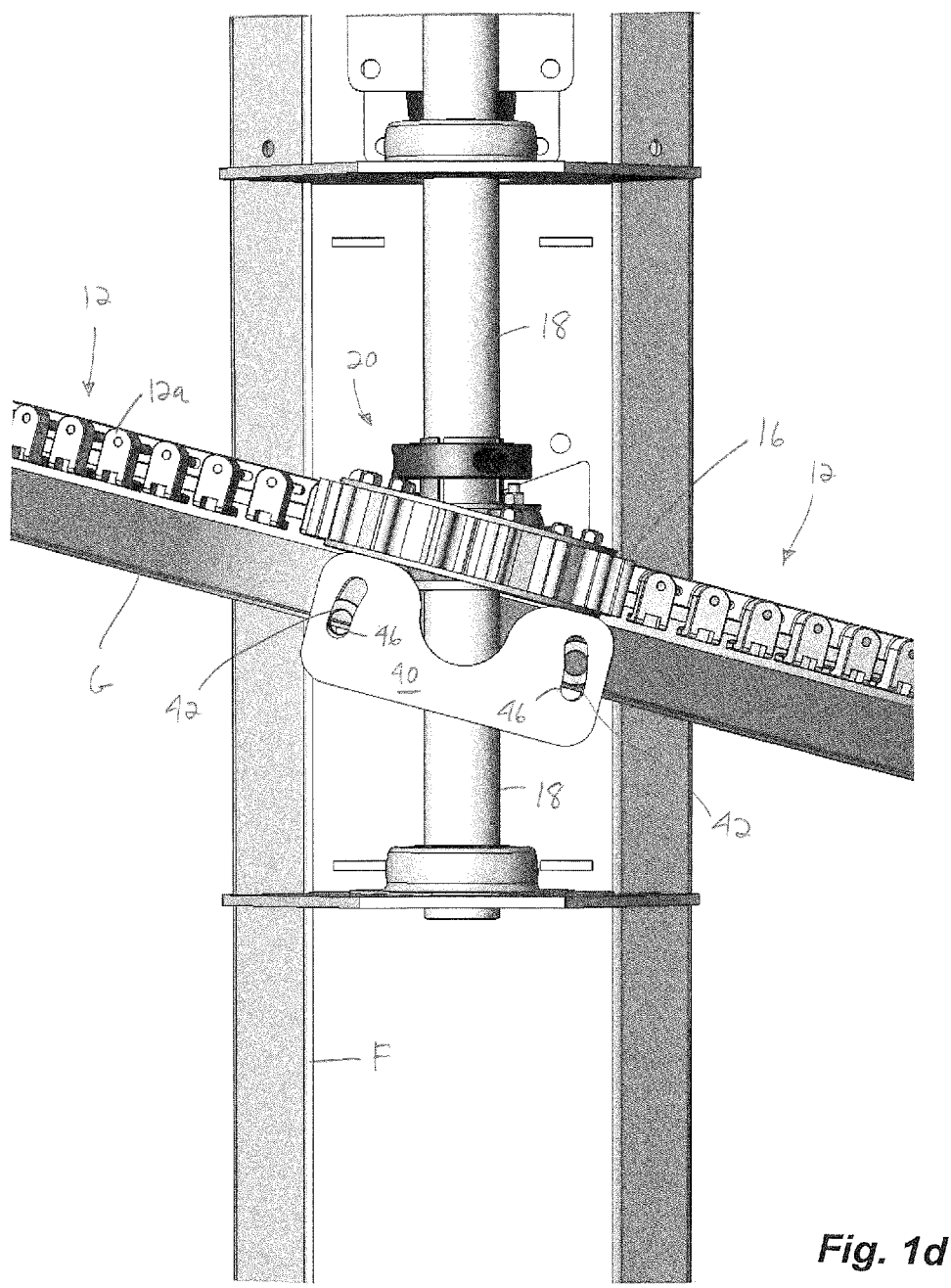
FIG. 1d is a side view of the sprocket of FIG. 11.

Turning now to FIG. 1a, it can be better understood that the chain 12 is adapted such that the conveying surface C is tilted or skewed relative to a horizontal plane, as would typically be the case in a conventional spiral conveyor. In order to drive the chain 12 along this incline, one embodiment of the drive arrangement described herein comprises an adjustable sprocket 16 for engaging side links of the chain 12 along an outer side edge, as shown in FIGS. 1b and 1c. Preferably, this sprocket 16 is adapted to pivot, most preferably relative to the horizontal plane, and such that an upper or lower planar face of the sprocket 16 is substantially parallel to the plane of the conveying surface C (see FIG. 1d). In a most preferred embodiment, this is achieved by attaching the sprocket 16 to a drive shaft 18 coupled to a motor M using a constant velocity joint 20.

Figure 2:
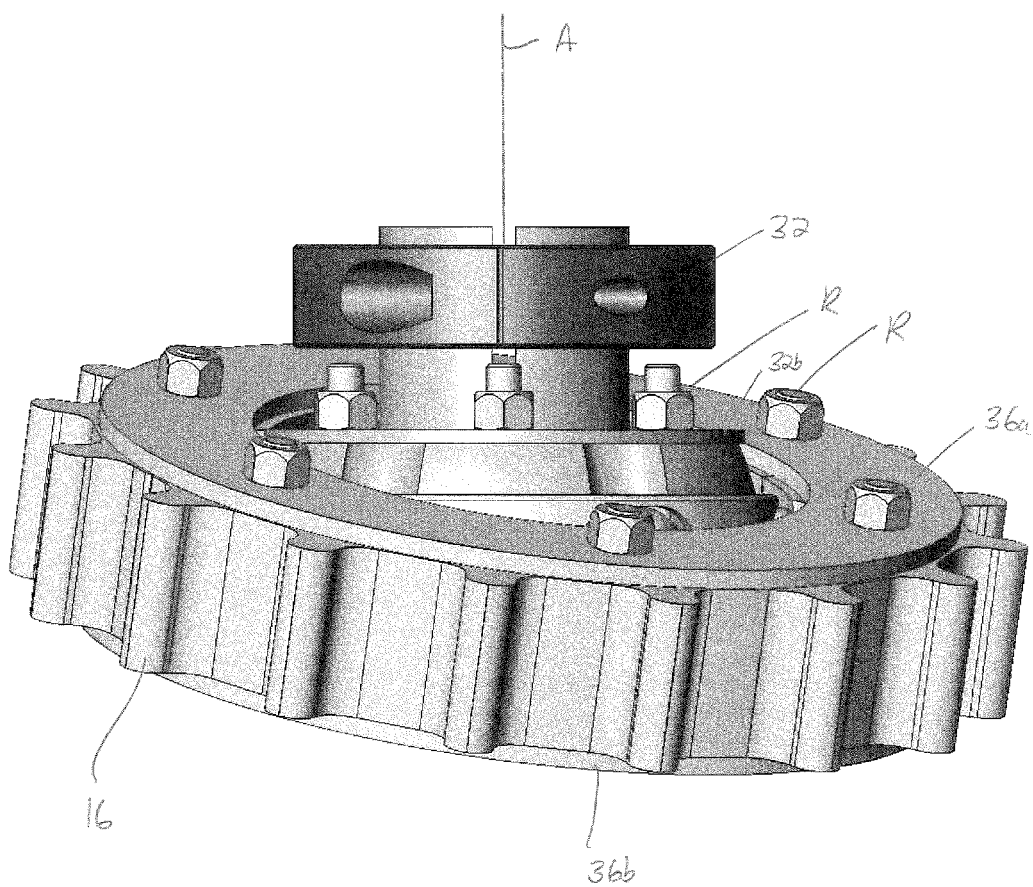
FIG. 2 is an enlarged perspective view of the sprocket incorporating a constant velocity joint.
Figure 2A:
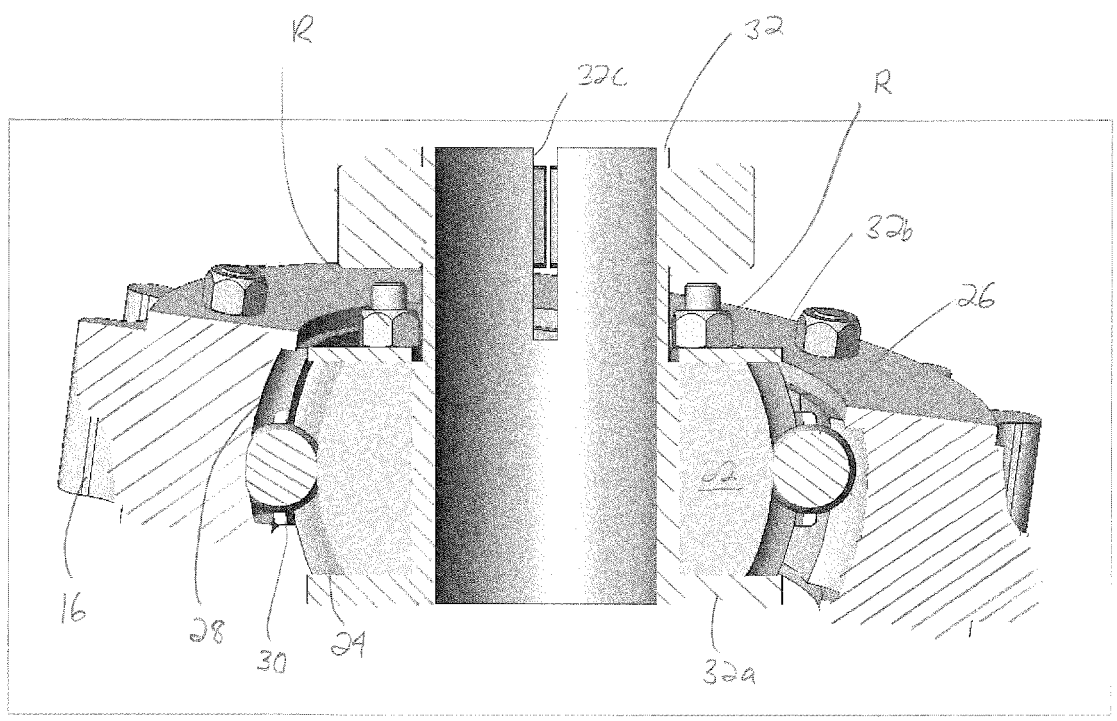
FIG. 2a is a partially cross-sectional, partially cutaway side view of the sprocket of FIG. 2, illustrating the mounting to a shaft.
Figure 2B:
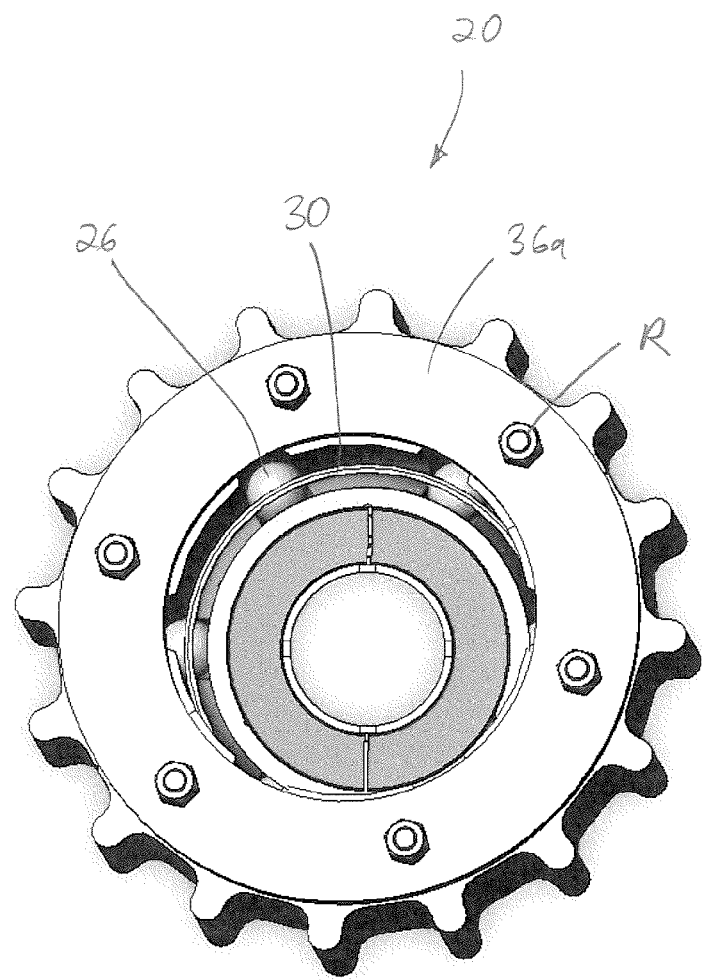
FIG. 2b is a top view of the sprocket of FIG. 2.
Figure 2C:
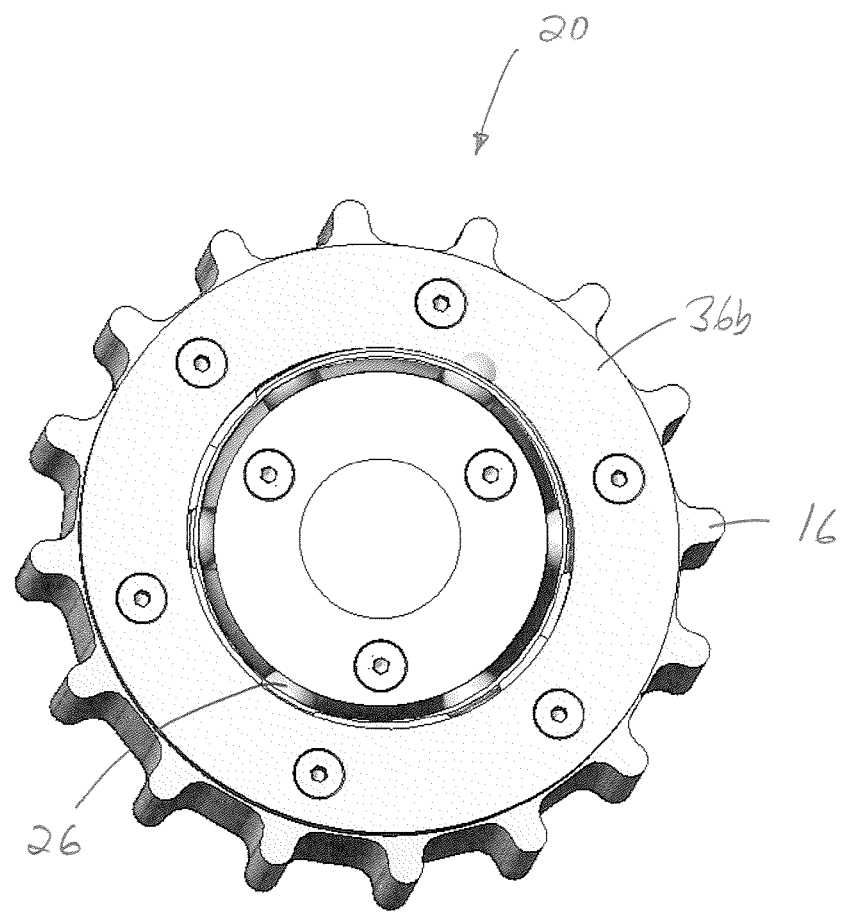
FIG. 2c is a bottom view of the sprocket of FIG. 2c.
Figure 2D:
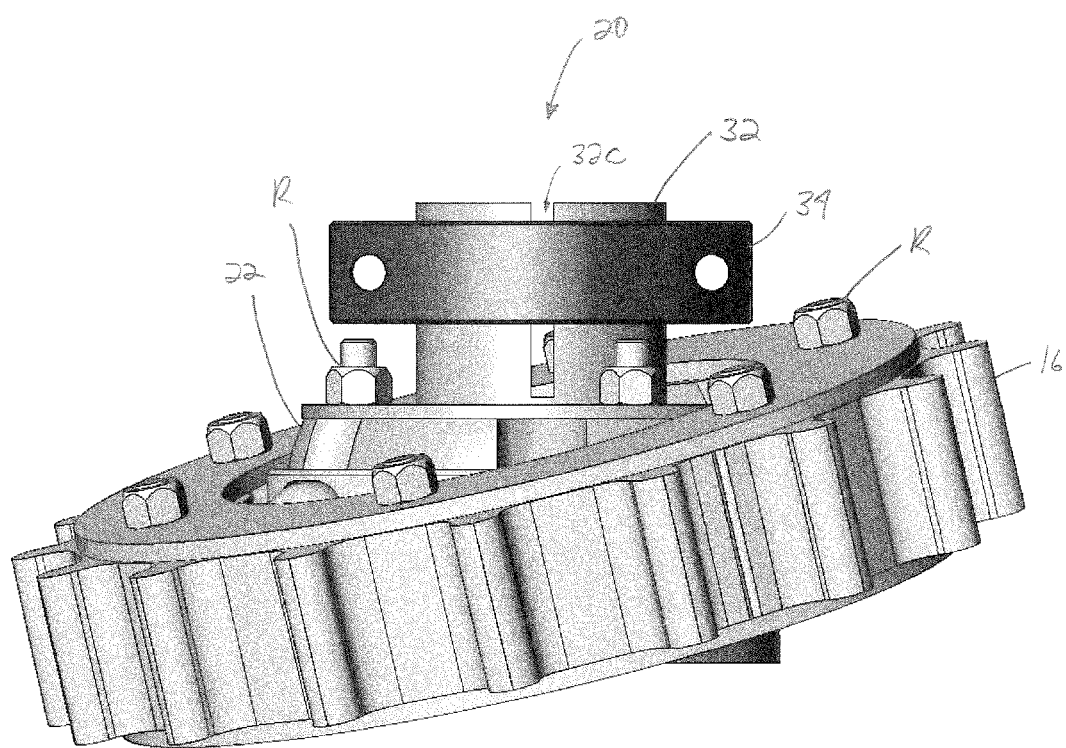

Turning now to FIGS. 2 and 2a-2d, the construction of a preferred embodiment of the constant velocity joint 20 for drivingly connecting the sprocket 16 to the drive shaft 18 is shown. With reference to FIG. 2a, the joint 20 includes an inner member 22 including a plurality of vertically extending peripheral channels 24 arranged circumferentially and adapted for receiving bearings, such as balls 26. A matching channel 28 is formed along the inner surface of the sprocket 16 for engaging an opposite face of each ball 26. An annular retainer 30 is also provided, and includes apertures for receiving and retaining the balls 26 in position in the channels 24, 28.

To mount the joint 20 to the drive shaft 18, an inner sleeve 32 is provided, preferably with a cutout 32c such that a compression fitting 34 can be used to secure the structures together in a conventional manner. The sleeve 32 may also include a lower retainer 32a for engaging and supporting the inner member 22, and an upper retainer 32b may also be provided for fixing the inner member 22 to rotate with the shaft 18, such as by using suitable fasteners R. Preferably, the sprocket 16 comprises a split structure divided into two generally symmetrical halves to facilitate attachment to and removal from the drive shaft 18 without necessitating removing the shaft from the conveyor system S. Consequently, upper and lower ring plates 36a, 36b may also be provided along with suitable fasteners R to hold the assembly together.

As should be appreciated, providing the joint 20 as described allows for the sprocket 16 to pivot relative to the longitudinal axis A of the drive shaft 18 while being driven. Accordingly, the sprocket 16 may be aligned to be substantially parallel to a horizontal plane, or tilted at a particular angle relative to it, such as to align the leading edges of the sprocket teeth 16a with the corresponding engagement faces of the side links 12a of the chain 12 (and with the planar faces of the sprocket generally parallel to the conveying surface). As should be appreciated, the particular range of angles may vary depending on the construction, and preferably generally ranges from about ±1-20°.

Turning back to FIGS. 1a-1d, it may be desirable in some instances to fix the relative angle of the sprocket 16 once the desired pivoted condition is reached. In the illustrated embodiment, this is most preferably achieved using at least one, and preferably a pair of spaced retainers in the form of plates 40 for engaging the lower plate 36b of the sprocket 16. These plates 40 may be secured to a guide G for the conveyor chain 12 using posts 42, the ends of which pass through arcuate adjustment slots 46. As should be appreciated from FIG. 1d, by selectively positioning the posts 42 within the slots 46, the upper ends of the plates 40 may be caused to engage the lower plate 36b and thereby fix the sprocket 16 in the desired pivoted condition. However, in many situations, such a holding function is unnecessary, as the engagement between the sprocket 16 and the chain 12 will serve to maintain the desired angular orientation.

Figure 3:
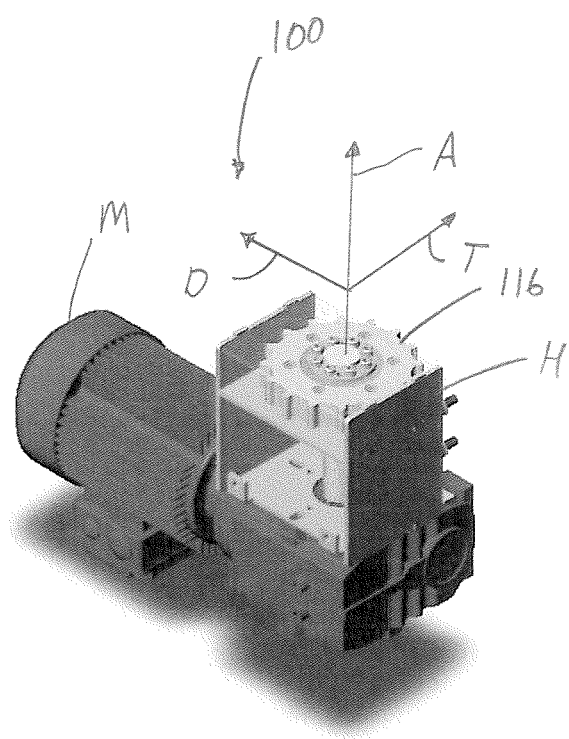
FIG. 3 is a perspective view of a driver for use with a conveyor system.
Figure 3A:
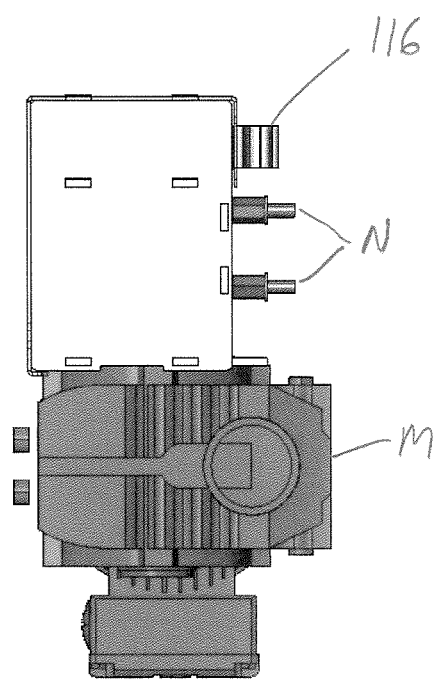
FIG. 3a is an end view of the driver of FIG. 3.

In accordance with another aspect of the disclosure, other embodiments of drive arrangements for modular link conveyors are shown. Thus, turning now to FIGS. 3 and 3a-3b, a drive arrangement 100 for a conveyor system S including a modular link chain 112, as described above, includes a motor M for driving a sprocket 116. As can be appreciated, the sprocket 116 is mounted for rotation about an axis A generally orthogonal to the conveying direction D and a transverse direction T. Hence, in the illustrated embodiment, the corresponding drive shaft 118 is generally vertically oriented. A housing H and suitable mounts N for connecting with the guide rail G of the conveyor system S at a desired location may also be provided.

Figure 4:
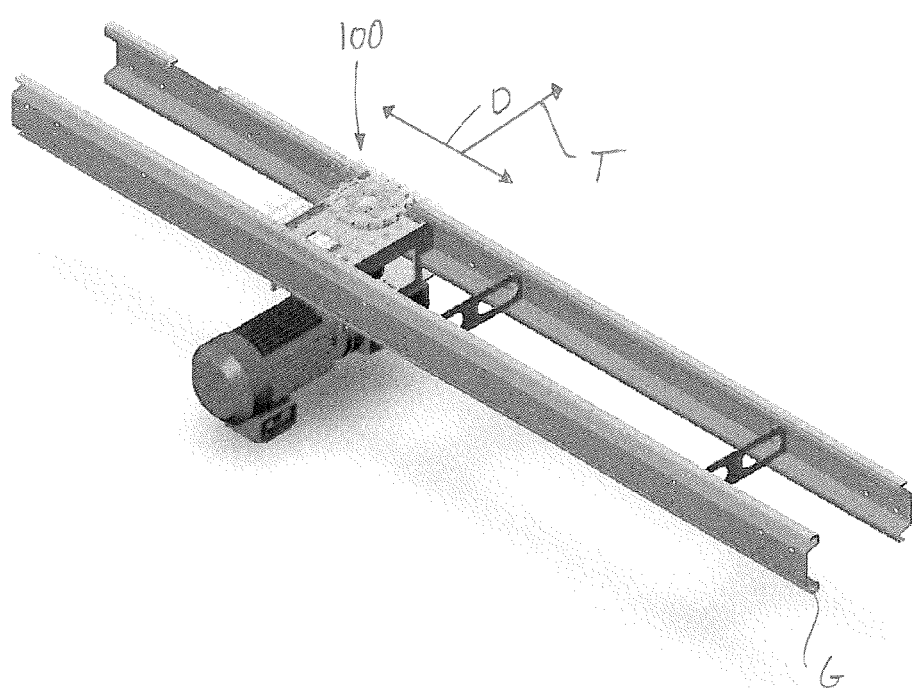
FIG. 4 is a perspective view showing the driver of FIG. 3 associated with a conveyor frame.
Figure 4A:
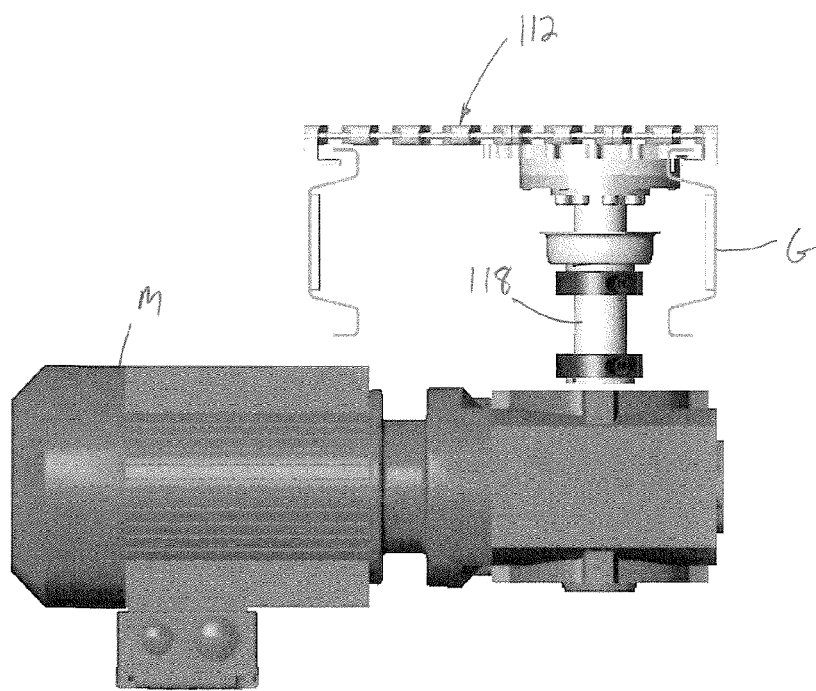
FIG. 4a is an end view of the conveyor frame of FIG. 4, and including a modular link conveyor chain.
Figure 4B:
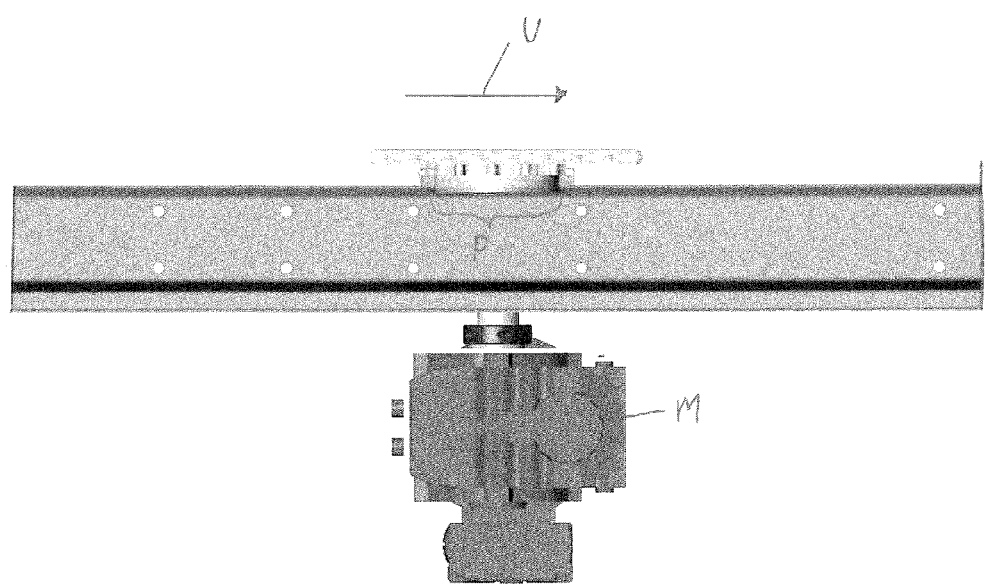
FIG. 4b is a side view of the conveyor of FIG. 4.
Figure 4C:
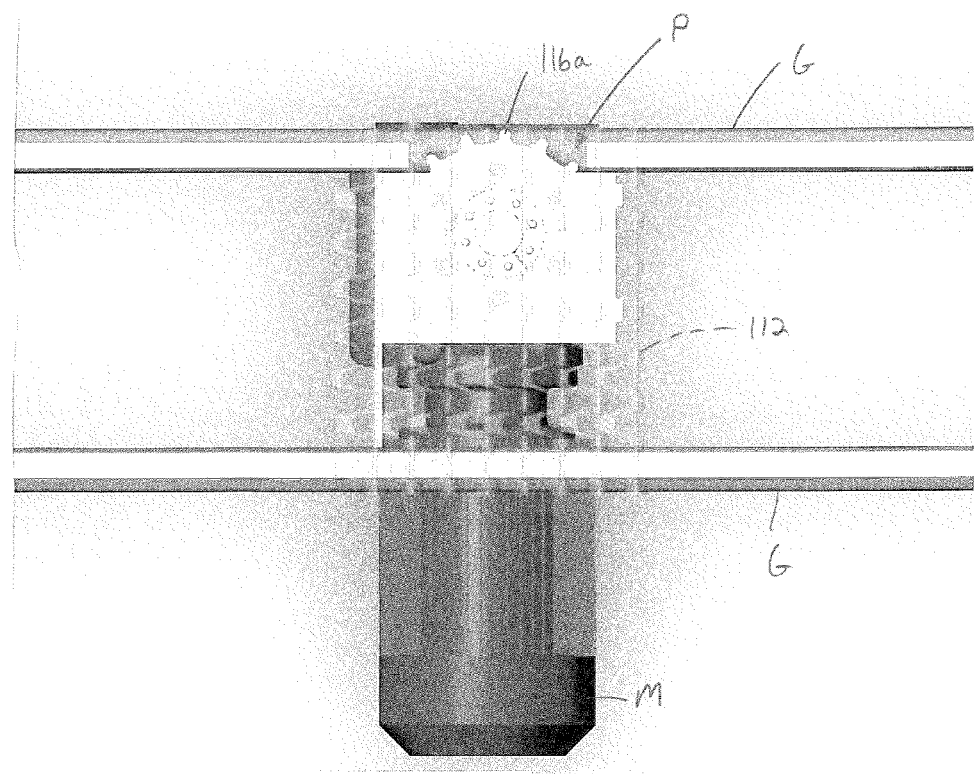
FIG. 4c is a top view of the conveyor of FIG. 4.
Figure 5:
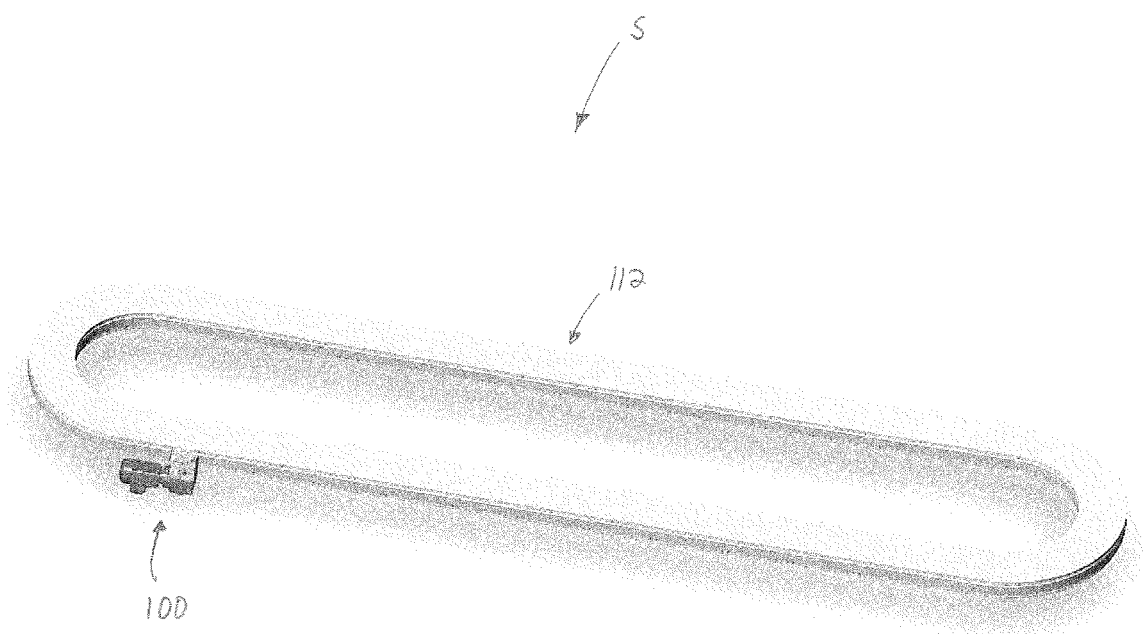
FIG. 5 illustrates in perspective the driver associated with a conveyor system, but positioned external to the outer side edge of the chain.
Figure 5A:
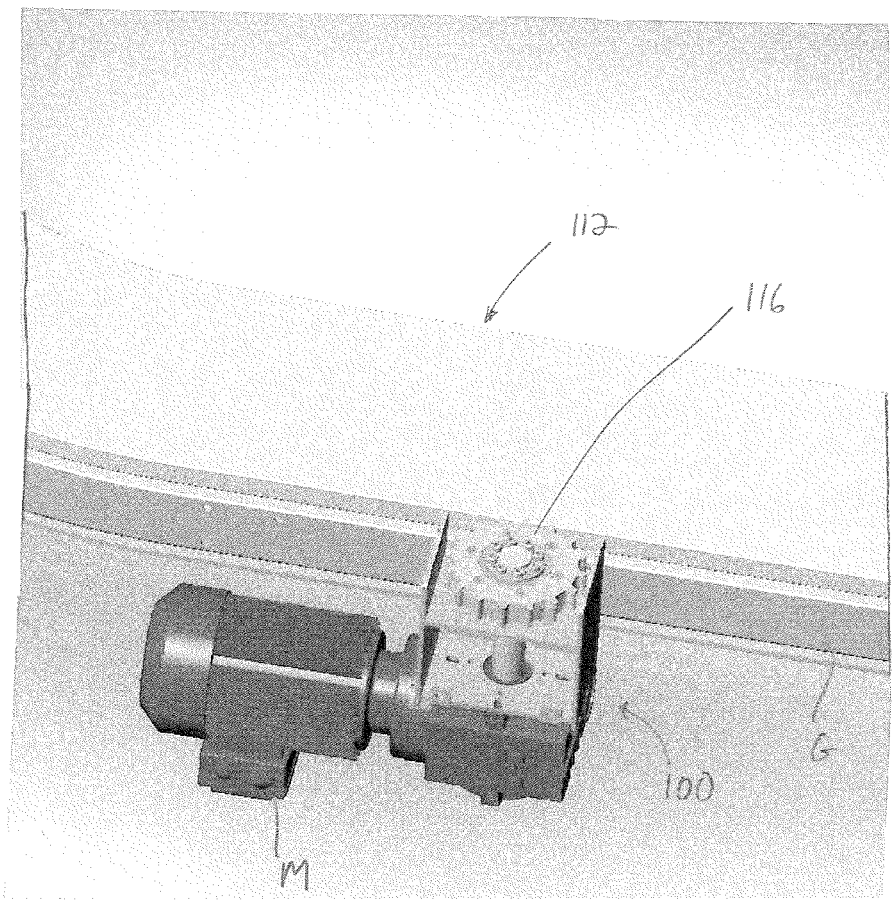

A driver 100 of this configuration may be used to drive a modular link chain 112 in a number of different ways. For instance, with reference to FIGS. 4 and 4a-4c, the driver 100 may be positioned between the guide rails G supporting and guiding the chain 112 (and thus below the conveying surface C) and arranged to contact and drive the side links 112a along the forward (or upper) run U. In an exemplary embodiment, this may be achieved by providing a gap P in one of the guide rails G to expose the teeth 116a of the sprocket 116 driven by shaft 118 to the inner surfaces of the side links 112a (see FIGS. 4b and 4c). Alternatively, as shown in FIGS. 5 and 5a, the driver 100 may be positioned external to the guide rails G, such as along an outside surface of side links of the chain 112 in a conveyor system S. The driver 100 may also be positioned along a curved or straight section of the conveyor system S. In any case, it should be appreciated that an endless conveying path may be provided without the need for returns, transfers, or the like. Also, it has been discovered that the driver 100 may be suitable for driving the chain 112 along elevations of ±5° without difficulty.

Figure 6:
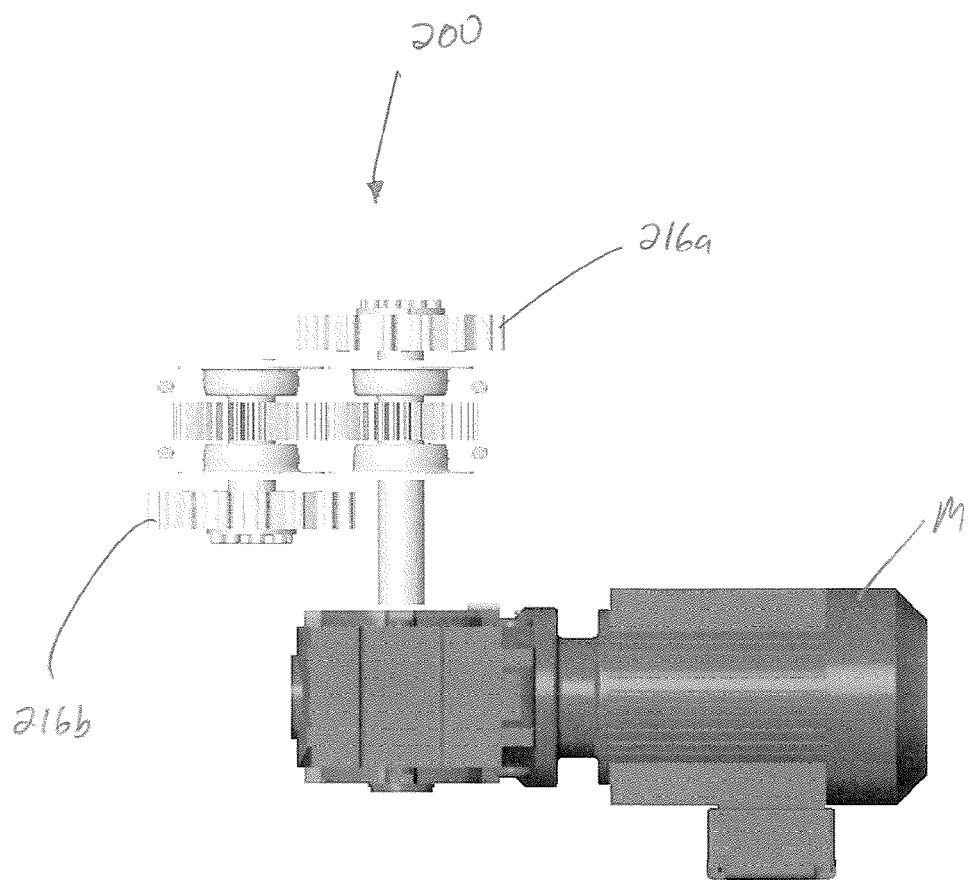
FIG. 6 illustrates in side view another embodiment of the driver according to the disclosure.
Figure 6A:
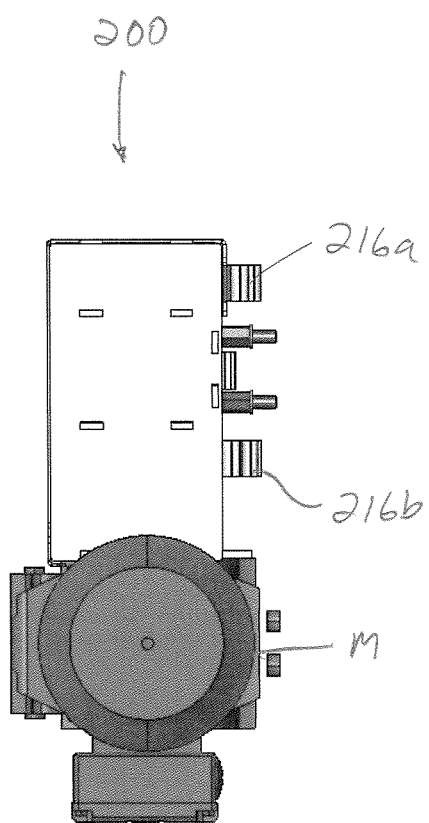
FIG. 6a illustrates in end view the driver of FIG. 6.
Figure 6B:
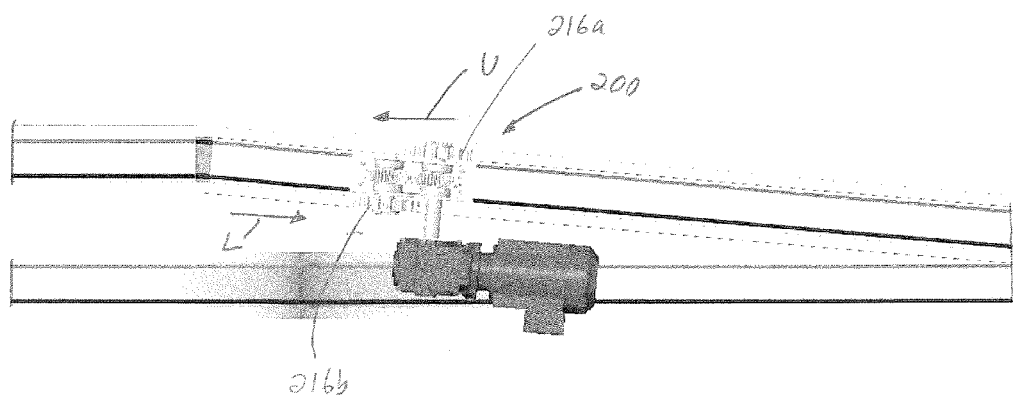
FIG. 6b shows the driver of FIG. 6a arranged for driving the forward and return runs of a conveyor.

Adaptations for use in connection with conveyors including return run arrangements are also possible. Thus, for example, as shown in FIGS. 6, 6a, and 6b, a driver 200 may be adapted to include two sprockets 216a, 216b, one for engaging the chain along the forward run U and the other for engaging the chain along the return run L. The sprockets 216a, 216b are mounted for rotation about an axis A generally orthogonal to the conveying direction and a transverse direction. Driving the sprockets 216a, 216b in opposite directions using a single motor M may be achieved using a suitable gear train, as shown.

Figure 7:
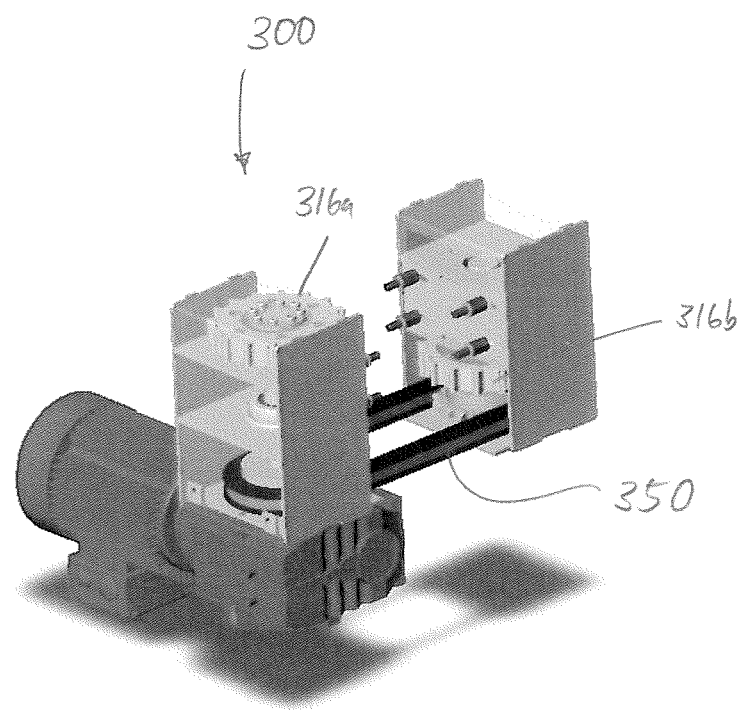
FIG. 7 is a perspective view of another embodiment of a driver for driving a conveyor.
Figure 7A:
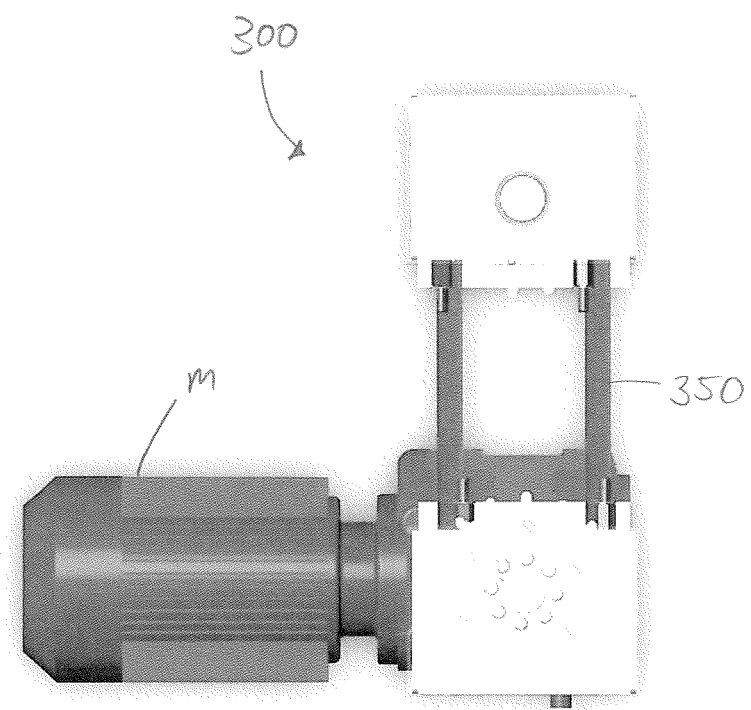
FIG. 7a is a bottom view of the driver of FIG. 7.
Figure 7B:
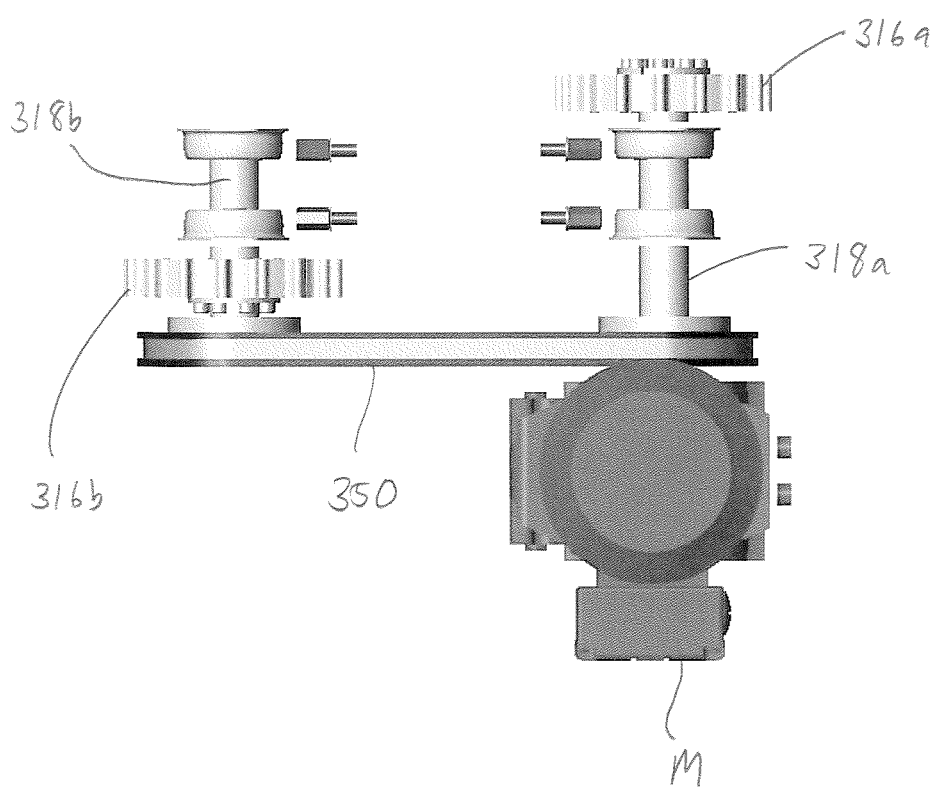
FIG. 7b is a side view of the driver of FIG. 7.
Figure 7C:
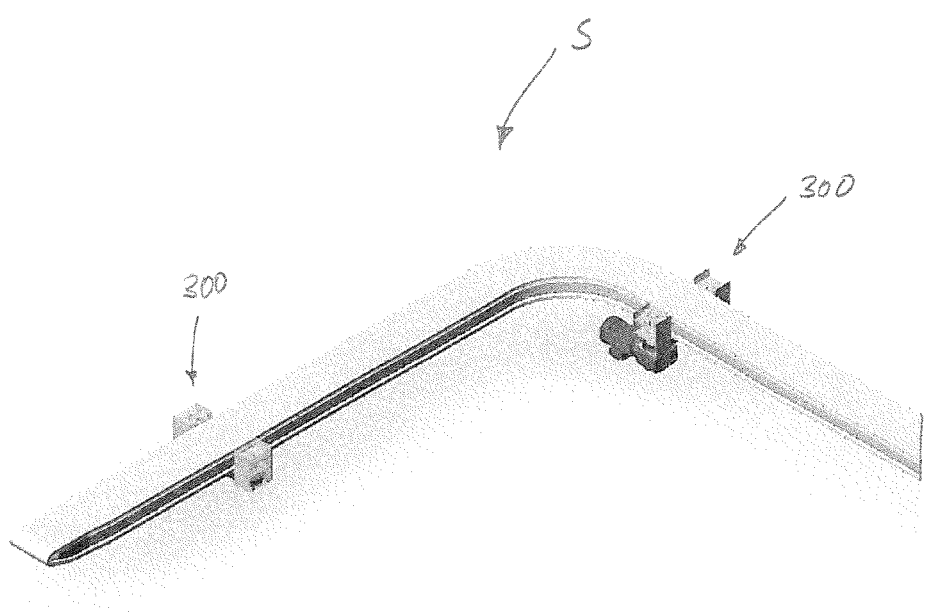
FIG. 7c shows two of the drivers of FIG. 7 mounted along a conveyor.

FIGS. 7 and 7a-7c show an embodiment in which a driver 300 for a modular link conveyor includes sprockets 316a, 316b arranged for driving the forward and return runs, respectively, from opposite sides. Thus, in the illustrated embodiment, a first sprocket 316a is positioned for engaging the chain along the forward run, and the opposite sprocket 316a is arranged for engaging the chain along the return run. A single motor M may be used, with rotational force being transmitted by the shaft 318a associated with sprocket 316a to shaft 318b associated with sprocket 316b by an endless belt or chain 350. FIG. 7c shows the use of two such drives 300 in a system S.

Figure 8:
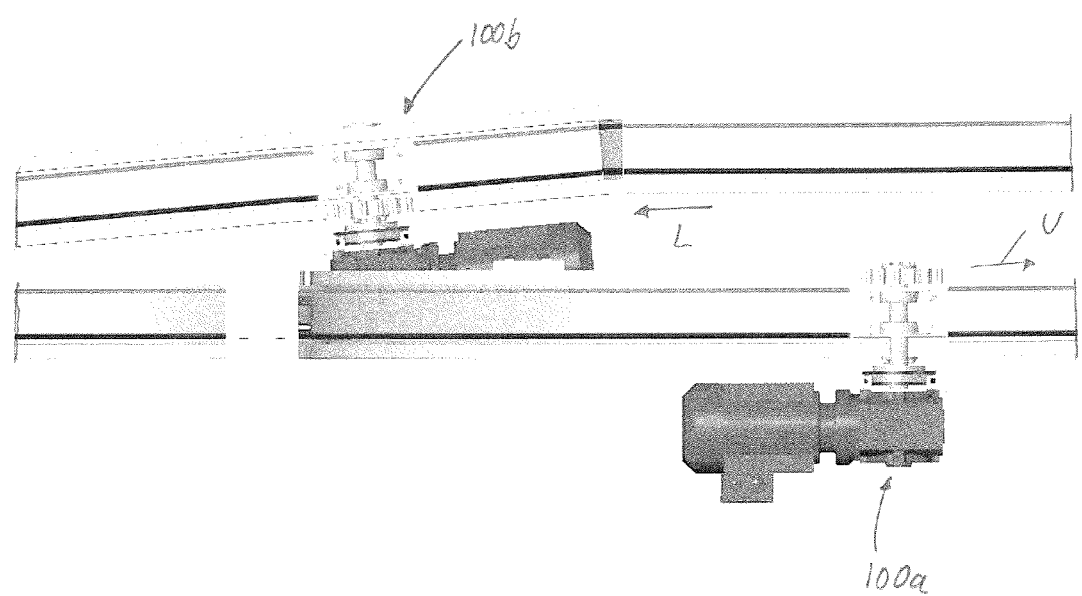
FIG. 8 illustrates other drive arrangements for a conveyor system.

FIG. 8 shows that two different drives 100a, 100b may be provided for driving the forward run U and return runs L at different positions along the conveying path. Any of the drives mentioned above may be used in multiple forms as necessary or desired for a particular application.

Turning to FIGS. 9 and 9a-9c, another arrangement of an adjustable sprocket 400 is shown for use with any of the above-described conveyors or others. As perhaps best understood with reference to the exploded view of FIG. 9a, the sprocket 400 comprises first and second portions 402, 404, which may be generally considered as halves. The portions 402, 404 may include protrusions or bosses 406 that correspond to matching recesses 408. A receiver 410 in each portion 402, 404 is adapted for receiving the drive shaft for driving the sprocket 400 when mounted thereon.

Figure 10:
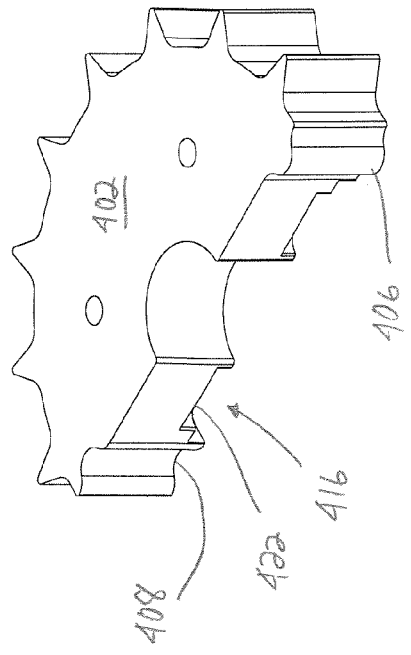
FIG. 10 is a perspective view of one sprocket portion.
Figure 10A:
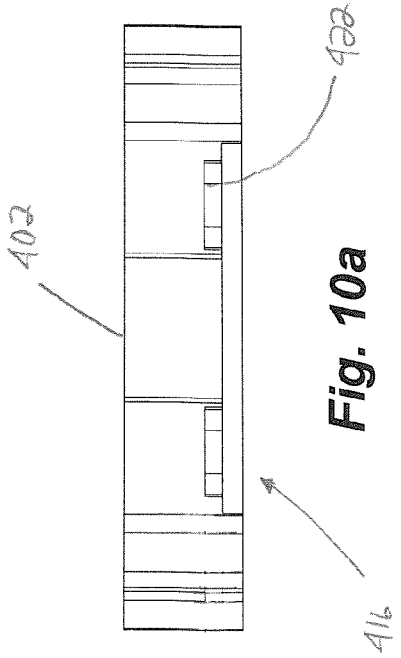
FIG. 10a is a side view of the sprocket portion of FIG. 10.
Figure 10B:
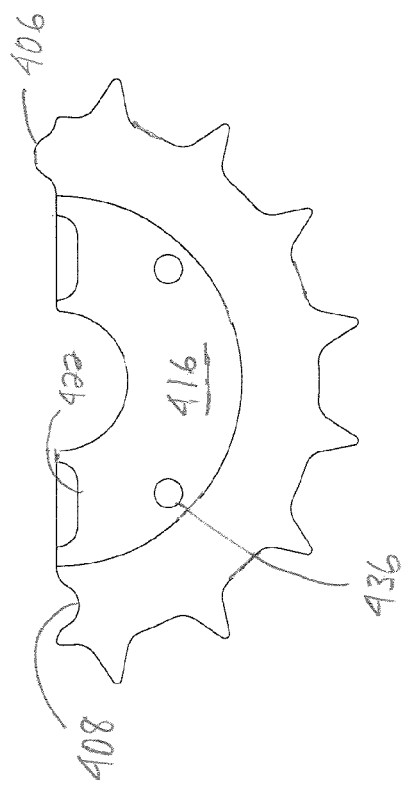
FIG. 10b is a bottom view of the sprocket portion of FIG. 10.

To connect the sprocket 400 to the drive shaft, a locking assembly may be provided. This assembly comprises a retainer 412, which is preferably divided into portions 414, 416, which are illustrated as being semi-circular. This retainer 412, or more specifically, the mated portions 414, 416, are designed to fit into a corresponding recess 418 (which is preferably annular, but could take other forms) provided in one side of the split sprocket 400 when the sprocket portions 402, 404 are mated (see FIG. 10). As should be appreciated, each sprocket portion 402, 404 may include approximately one half of the circumference of the recess 418.

The plate 412 further includes at least one, and preferably a pair of openings in the form of slots 418, each adapted for receiving a key 420 in close fitting engagement. The key 420 is sized for passing through the slots 418 and into a corresponding cavity 422 associated with the recess 418 of the sprocket 400. As with the recess 418, each sprocket portion 402, 404 may include a portion of cavity 422.

The assembly may further include a pair of collars 424, 426. These collars 424 may comprise a split hub 426 formed of sections 428, 430 held together by fasteners 432 extending generally tangentially through matched openings in the mated hub sections 428, 430. The tightening of these fasteners connects the locking collars 424, 426 to the respective drive shaft at the desired location, and sandwich the sprocket 400 (see FIG. 9b).

As can be seen in FIG. 9a, the sections 428, 430 of collar 424 corresponding to the side of the sprocket 400 receiving the plate 412 includes a notch 432 for receiving a portion of the corresponding key 420 projecting from the respective plate portions 414, 416. As the collar 424 is connected to the drive shaft, it forms a driver or connector such that its rotation via the shaft causes torque to be transmitted to the sprocket 400, which in turn may drive the conveyor via the engagement between the teeth and the links (which may be side links, as noted above, but could also be any other surface of the conveyor chain). The other collar 426 may simply serve to abut the corresponding face of the mated sprocket portions 402, 404.

As can be understood from FIGS. 9 and 9a, the sprocket portions 402, 404 and plate portions 414, 416 may include matching apertures 434, 436. Corresponding fasteners 438 may be provided for securing the sprocket portions 402, 404 to the plate portions 414, 416, along with washers 440 (conventional, locking, or both, as shown). As should be appreciated, it is desirable to part the sprocket portions 402, 404 and plate portions 414, 416 on dividing lines that do no align (see FIG. 9d, and note generally orthogonal condition of the dividing lines).

An advantageous feature of the above-described sprocket 400 is its ability to be completely assembled on the drive shaft without the need to sliding any of the parts along the drive shaft. This allows for the sprocket 400 to be installed, adjusted, or replaced, without the need for removing the drive shaft from the mounted condition. Loosening the collars 424, 426 also allows for minor positional adjustments to be made to improve the transmission of power. No modification of the drive shaft is required to accommodate the sprocket 400, either.

The foregoing descriptions of various embodiments of drive arrangements and related methods provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. An apparatus for conveying one or more objects along a conveying path in a conveying direction, comprising:
   an endless conveyor chain formed of modular links arranged in rows in a direction transverse to the conveying direction, including spaced outer side links forming a part of a conveying surface for the objects to be conveyed and intermediate links interconnected with side links by connector rods, the chain having at least a forward run for conveying one or more objects in the conveying direction;
   a driver for driving the conveyor chain, the drive including a first sprocket adapted for engaging at least one side link along at least one side of the chain, the first sprocket mounted for rotation about an axis generally orthogonal to the conveying direction and the transverse direction.

2. The apparatus of claim 1, wherein the first sprocket is arranged for contacting an outer surface of the side link opposite a next-adjacent intermediate link.

3. The apparatus of claim 1, wherein the first sprocket is arranged for contacting an inner surface of the side link below the conveying surface.

4. The apparatus of claim 1, further including a second sprocket mounted for rotation about an axis generally orthogonal to the conveying direction for contacting at least one side link.

5. The apparatus of claim 4, wherein the conveyor chain includes a return run including the at least one side link contacted by the second sprocket.

6. The apparatus of claim 4, wherein the first sprocket is supported by a first shaft, the second sprocket is supported by a second shaft, wherein the first and second shafts are connected by a connector.

7. The apparatus of claim 4, wherein the first and second sprockets are driven by a common drive motor.

8. The apparatus of claim 4, wherein one of the first or second sprockets comprises a split sprocket.

9. The apparatus of claim 4, wherein one of the first or second sprockets is mounted for pivoting movement relative to the side links of the conveyor.

10. An apparatus for conveying one or more objects along a conveying path in a conveying direction, comprising:
    an endless conveyor chain comprised of a plurality of modular links forming a forward run with a conveying surface for supporting one or more objects in the conveying direction and a return run;
    a first sprocket adapted for engaging at least one link along at least one side of the chain along the forward run, the first sprocket mounted for rotation about an axis generally orthogonal to the conveying direction; and
    a second sprocket adapted for engaging at least one link along at least one side of the chain along the return run, the second sprocket mounted for rotation about an axis generally orthogonal to the conveying direction.

11. The apparatus of claim 10, wherein the first sprocket engages the link along a first outer side of the chain.

12. The apparatus of claim 10, wherein the second sprocket engages the link along a second outer side of the chain opposite the first outer side.

13. The apparatus of claim 10, wherein the first sprocket engages the link under the conveying surface.

14. The apparatus of claim 10, wherein the first and second sprockets are spaced in the conveying direction.

15. The apparatus of claim 10, wherein the first and second sprockets are spaced in a direction transverse to the conveying direction.

16. The apparatus of claim 10, further including a motor for driving the first and second sprockets.

17. The apparatus of claim 16, further including a gear train for driving the first sprocket in an opposite direction relative to the second sprocket.

18. The apparatus of claim 16, further including an endless belt for driving at least one of the first or second sprockets.

19. The apparatus of claim 10, further including a first motor for driving the first sprocket and a second motor for driving the second sprocket.

20. The apparatus of claim 10, wherein one of the first or second sprockets comprises a split sprocket.

21. The apparatus of claim 10, wherein one of the first or second sprockets is mounted for pivoting movement relative to the links of the conveyor.

22. The apparatus of claim 10, wherein the endless conveyor chain comprises a single endless conveyor chain.

\* \* \* \* \*